United States Patent [19]
Comer, Jr. et al.

[11] 3,768,329
[45] Oct. 30, 1973

[54] CONTROL MECHANISM FOR POWER SHIFT TRANSMISSION

[75] Inventors: Glen S. Comer, Jr., Peoria, Ill.;
Thomas E. Allen, Mustang, Okla.

[73] Assignee: Caterpillar Tractor Co., Peoria, Ill.

[22] Filed: May 28, 1971

[21] Appl. No.: 148,055

[52] U.S. Cl. .................................................. 74/477
[51] Int. Cl. ............................................... G05g 7/00
[58] Field of Search ................... 74/477, 473 R, 475, 74/476

[56] References Cited
UNITED STATES PATENTS

| | | | |
|---|---|---|---|
| 3,626,780 | 12/1971 | Lowder et al. | 74/473 R |
| 1,736,330 | 11/1929 | Schmidt | 74/477 UX |
| 2,265,260 | 12/1941 | Argo | 74/473 R UX |
| 2,434,735 | 1/1948 | Chausson | 74/477 X |
| 3,364,779 | 1/1968 | Cambria | 74/473 |

FOREIGN PATENTS OR APPLICATIONS

| 969,773 | 5/1950 | France | 74/473 R |

Primary Examiner—Milton Kaufman
Attorney—Fryer, Tjensvold, Feix, Phillips & Lempio

[57] ABSTRACT

A shift lever for a transmission having forward and reverse gears is arranged to move in a substantially U-shaped path for controlling the transmission. The shift lever is operatively connected through a linkage system which provides for translation of the substantially U movement of the shift lever to a straight line motion at the transmission shift member.

8 Claims, 3 Drawing Figures

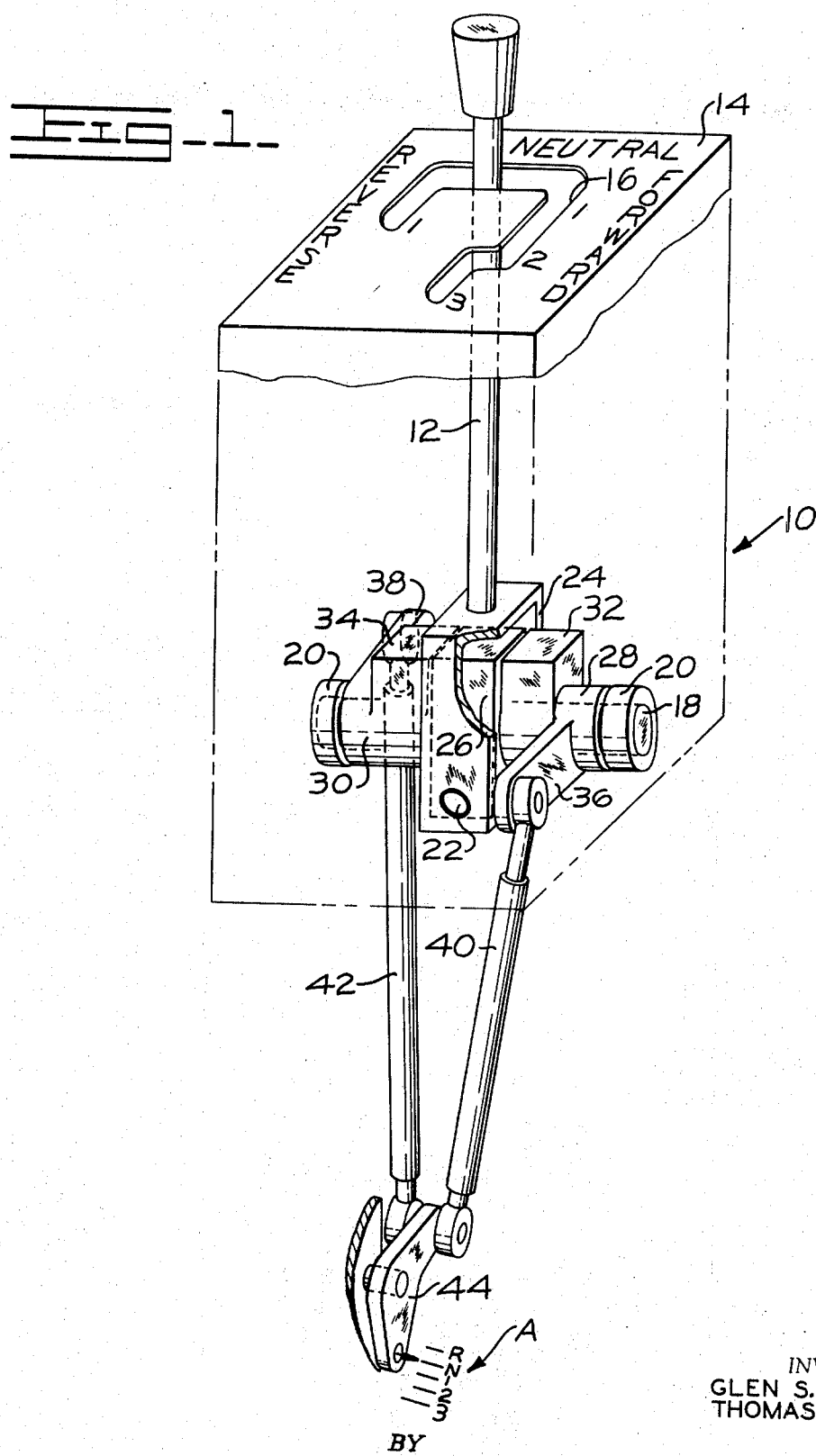

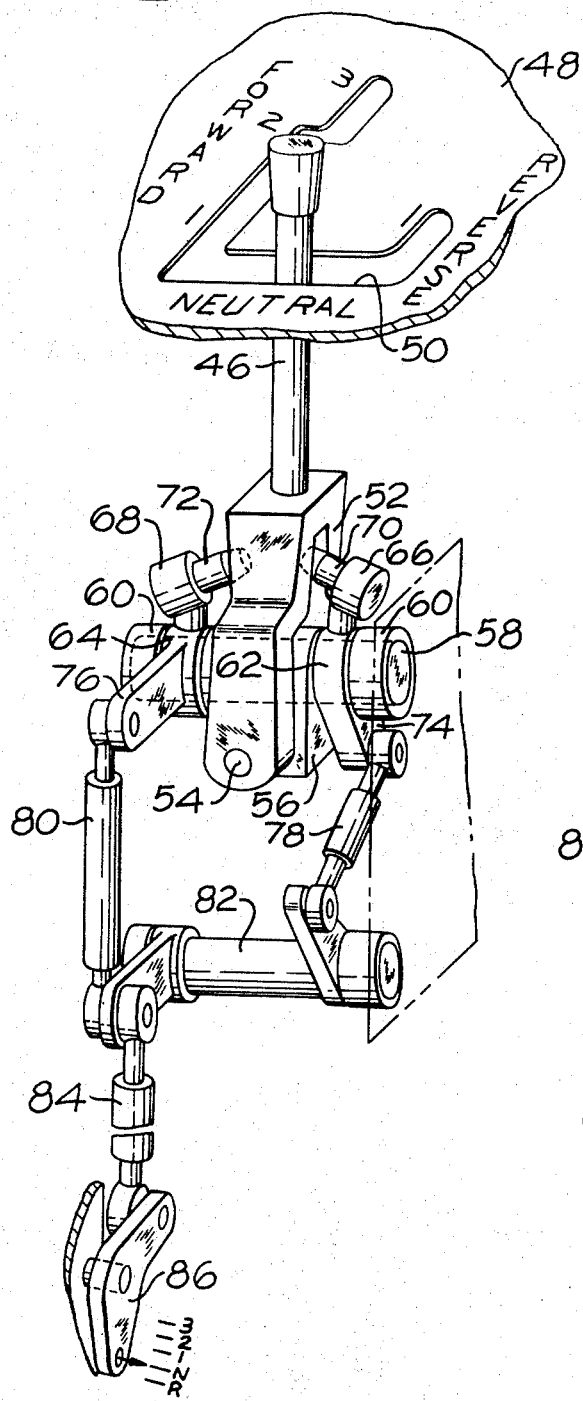
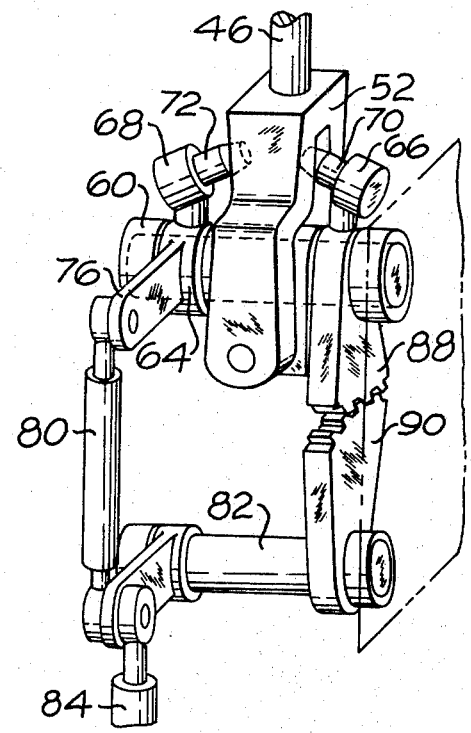
INVENTORS
GLEN S. COMER, JR.
THOMAS E. ALLEN
BY Fryer, Tjensvold, Feix, Phillips & Lempio
ATTORNEYS 3,768,329

CONTROL MECHANISM FOR POWER SHIFT TRANSMISSION

BACKGROUND OF THE INVENTION

The present invention relates to a shift lever for a transmission and pertains more particularly to a linkage arrangement for translating multidirectional motion of a shift lever into a straight line motion of a transmission shift member.

A single control lever is commonly used for shifting a vehicle transmission between any number of forward and reverse gears. The shift lever is commonly connected to the shifting member or members by means of a complex arrangement of cams, links and levers. Any number of shift lever patterns are possible for a given transmission. For this reason each machinery manufacturer normally has his own shift pattern for his vehicles. This condition creates confusion and often hazardous conditions when an operator transfers from one manufacturer's vehicle to another's.

Human engineering safety committees have advocated that construction machinery manufacturers standardize shift pattern designs so that equipment operators can change from one machine to another without the confusion and hazards inherent in the present diverse designs.

Since a number of transmissions currently employ a single shifting member such as a valve which is either movable in a straight line or rotatable between positions to select forward and reverse, with an intermediate neutral position, a straight line shift pattern would simplify standardization. However, such a shift pattern would not have adequate safety features because it would be possible to shift straight through neutral to or from either one of forward or reverse conditions. It is desirable that the linkage be ranged such that the shift lever must stop momentarily in a neutral position before shifting to the forward or reverse conditions, as the case may be.

One preferred shift pattern which seems to offer the greater advantages is that of the U-shaped pattern. With the U-shaped pattern, the forward speed confitions are selected with the lever in one leg of the U with reverse positions found in the other leg and neutral condition in between. Such a shift pattern provides a definite stop position between the two legs of the U. Such a pattern requires a definite movement in one direction or another between the two legs and consequently indicates a definite position between forward and reverse conditions.

This type shift pattern is compatable with a transmission which employs two separate shifting members such as valves as disclosed in U.S. Pat. No. 3,091,976, issued June 4, 1963, to Gordon W. Johnson et al.

The problem with using such a U-shaped shift pattern, however, has been the problem of accommodating this multidirectional movement of the shift lever to a straight line movement of a shifting member. Prior art devices for this purpose, therefore, normally have employed extremely complicated arrangements of levers and linkages to obtain this desired result.

SUMMARY OF THE INVENTION

It is the primary object of the present invention to provide a transmission shift system which overcomes the above problems of the prior art.

Another object of the present invention is to provide a simple linkage system for translating the complex movement of a shift lever to a simple, substantially direct line movement of a shift member.

A further object of the present invention is to provide a shift linkage for accommodating a substantially U-shaped shift pattern of a shift lever to a substantially straight line motion of a shift member.

A still further object of the present invention is to provide a shift linkage system which incorporates a substantially U-shaped shift pattern and operates a single shift member.

In accordance with the present invention, a transmission shift linkage is provided for a shift pattern confined to a substantially U-shaped movement. A linkage is provided which is operatively connected to the shift lever during movement along one leg of the U for shifting between the various forward speeds and is operatively connected to the shift lever during movement along the other leg of the U for shifting into and out of the reverse drive positions.

BRIEF DESCRIPTION OF THE DRAWINGS

The above and other advantages and objects of the present invention will become apparent from the following specification when read in conjunction with the accompanying drawings wherein:

FIG. 1 is a perspective view of a preferred embodiment of the present invention;

FIG. 2 is a perspective view of an alternate embodiment of the present invention;

FIG. 3 is a perspective view of a modification of the embodiment of FIG. 2.

DETAILED DESCRIPTION OF PREFERRED EMBODIMENT

Referring now to FIG. 1 of the drawings, there is illustrated a preferred embodiment of the present invention comprising a control linkage assembly generally designated by the numeral 10. The control linkage assembly 10 comprises a shift lever 12 pivotally mounted for pivotal movement about two generally transverse axes and guided for movement through a desired shift pattern by means of a guide plate 14 having an appropriately shaped slot 16 through which the lever 12 extends. The lever 12 is suitably mounted such as by means of a shaft 18 for pivotal movement about a first axis corresponding to the axis of the shaft 18. The shaft 18 may be appropriately mounted such as by bearings 20 in a housing (not shown). The lever 12 is further mounted for pivotal movement about a second axis such as by means of pins 22 supported from the shaft 18 by a member 26 such that the second axis is transverse to the first axis and is displaced therefrom.

The lever 12 is provided with a bifurcated or yoke section 24 which encircles a support member or block 26 and is pivotally supported thereon by the pins 22 for movement transverse to the axis of shaft 18.

A pair of arms or bell cranks 28 and 30 are pivotally mounted on shaft 18 for movement about the axis thereof. The bell cranks 28 and 30 are preferably identical in construction and each includes arms 32 and 34, respectively, which are selectively engageable and disengageable as will be described below, with lever 12 by means of yoke 24. The yoke 24 is slightly wider than the block member 26 and the space between arms 32 and 34 so as to overlap or envelop both arms when in the centered neutral position. This is a safety feature with both arms or bell cranks 28 and 30 locked together with the lever 12 in the neutral position. The other arm 36 of bell crank 28 and 38 of bell crank 30 are connected by links 40 and 42, respectively, to a shifting member 44 which is connected in any suitable manner (not shown) to a shifting valve or yoke of a transmission.

Referring now to FIG. 2, there is illustrated an alternate embodiment of the present invention wherein a shift lever 46 is mounted for pivotal movement about two transverse axes and is guided by means of a guide plate 48 having a guide slot 50 of the desired configuration. The lever 46 includes a yoke section 52 which is pivotally mounted by means of a pin 54 which is offset by means of a block 56 from the pivotal axis of a shaft 58. The shaft 58 is suitably mounted such as by means of bearings 60 in a suitable console housing. A pair of bell cranks 62 and 64 are mounted on the shaft 58 and include upper arms 66 and 68 respectively, having pins 70 and 72 for selective connection and/or disconnection with the yoke means 52 of the lever 46. The bell cranks 62 and 64 also include arms 74 and 76 which are connected by means of links 78 and 80 to a bell crank 82. The bell crank 82 is connected by a link 84 to a shifting member 86 which is operatively connected in a suitable manner (not shown) for shifting a multi-speed transmission.

Referring now to FIG. 3, there is illustrated a modification of the embodiment of FIG. 2, wherein identical elements are designated by the same reference numeral. In the construction of FIG. 3, the bell crank 62 and one arm of the bell crank 82 have been replaced by sector gears 88 and 90. It will be observed that these mechanisms will result in the same type motion between the two members. That is, the bell crank in 62 and 82 of FIG. 2 will be forced to rotate in the opposite direction due to the link connection 78. Likewise, the sector gears 88 and 90 will rotate in the opposite direction. Thus, the same motion conversion is obtained through this branch of the linkage system.

The operative connection through the above described linkage systems is such that when the shift lever in FIG. 1, for example, is moved to the right as viewed from the observer, the connection between yoke 24 and arm 34 will be broken and a connection more fully established between the yoke member 24 and the block 32 by the yoke 24 embracing arm 32. Thus, when the lever 12 is moved down the right leg of slot 16 the bell crank 28 moves with lever 12 forcing the lower end of the shift member 44 to move in a direction for movement from the neutral position in a direction toward the observer to position 1, 2 or 3, as indicated on scale A which has been added for illustrative purposes only. Returning the shift lever 12 along the slot 16 to the central position, as shown, will return the shift member 44 likewise to the neutral position. Positioning of the shift lever to the center position in the neutral slot connects the yoke member 24 with arm 34 of yoke 30 and leaves the upper arm 32 of the bell crank 28 connected with the shifting mechanism in the neutral position. Shifting the control lever 12 to the left along the neutral slot to the left side of the slot 16 operates to disconnect the yoke member 24 from the arm 32 of bell crank 28 such that movement of the lever 12 toward the observer along the left side of slot 16 moves the bell crank 30 such that the arm 38 moves upward, exerting an upward force on link 42 causing a movement of the shift member 44 in the opposite direction to the reverse position, as shown on scale A.

Thus, it is seen that the shift linkage is constructed such as to be operative to shift a transmission to the neutral position upon movement of the shift lever in the same direction against the stop regardless of whether the transmission is in the forward or reverse condition. Furthermore, it provides a system such that the operator must make a positive movement of the lever to one side or the other of the control console in order to select a forward or reverse gear, thus increasing the likelihood that he will be conscious of whether he is shifting into forward or reverse gears. Furthermore, the provision of the shift in a single direction to effect neutral provides a safety feature since the operator only has to make a single movement in a single direction regardless of what gear or drive position the vehicle is in.

While I have described my invention with respect to specific embodiments, it is to be understood that many modifications and changes in construction may be made without departing from the spirit and scope of the present invention as defined in the appended claims.

What is claimed is:

1. A control linkage system, said system comprising:
    a control lever pivotally mounted for two degrees of pivotal movement relative to its longitudinal axis;
    a single control member mounted to move between two extreme positions; and,
    means for selectively connecting said control lever to said single control member to move said single control member in a first direction in response to movement of said control lever in one direction in a first path and for movement of said control member in the opposite direction in response to movement of said control lever in a second path in said one direction.

2. The invention of claim 1 wherein said connecting means comprises a pair of pivotally mounted bell cranks; and,
    said control lever is mounted to operatively connect to one of said bell cranks in one path of movement, and to connect to the other of said bell cranks in the other path of movement.

3. The invention of claim 1 including guide means to guide said lever in a substantially U-shaped pattern.

4. The invention of claim 1 said connecting means comprising a pair of arms pivotally mounted for movement about an axis common with one axis of said control lever;
    said connecting means including a link for connecting said arms to said control member; and,
    said connecting means including yoke means for connecting said control lever to alternate ones of said arms when said lever is shifted between first and second paths.

5. A shift linkage mechanism, said mechanism comprising:
    a shift lever mounted for pivotal movement about a first and a second axis;
    a pair of arms pivotally mounted about said first axis adjacent said lever;
    said lever including means for selectively moving either one of said arms with said lever when said lever is moved first about said second axis and then about said first axis;
    a shift member; and, a pair of links connecting said arms to said shift member.

6. The invention of claim 5 wherein said arms extend in opposite directions about said axis.

7. A shift linkage mechanism, said mechanism comprising:
- a shift lever mounted for pivotal movement about a first axis, and a second axis transverse to and spaced from said first axis;
- a pair of arms pivotally mounted about said first axis and disposed adjacent and to either side of said lever;
- said lever including yoke means for selectively embracing and moving either one of said arms with said lever when lever is moved first about said second axis and then about said first axis;
- guide means defining a generally U-shaped configuration to guide said lever in selected parallel paths;
- said lever being connected to one of said arms when moving in one of said paths, to the other of said arms when moving in the other of said paths, and to both of said arms when in a neutral position between said paths; and
- linkage means operatively connecting said arms to a control member,
- said linkage means and one of said arms including sector gear means for changing the direction of motion transmitted from said shift lever to said control member.

8. A shift linkage mechanism, said mechanism comprising:
- a shift lever mounted for pivotal movement about a first axis and a second axis transverse to and spaced from said first axis;
- a pair of arms pivotally mounted about said first axis and disposed adjacent and to either side of said lever;
- said lever including yoke means for selectively embracing and moving either one of said arms with said lever when lever is moved first about said second axis and then about said first axis;
- guide means defining a generally U-shaped configuration to guide said lever in selected parallel paths;
- said lever being connected to one of said arms when moving in one of said paths, to the other of said arms when moving in the other of said paths, and to both of said arms when in a neutral position between said paths; and,
- each of said arms includes a pin at one end thereof extending toward said yoke means to be encompassed and engaged thereby.

* * * * *